REMOTE MOTOR CONTROL SYSTEM FOR TV TUNER

Filed April 27, 1960 2 Sheets-Sheet 1

INVENTORS
DANIEL A. TANNENBAUM &
ALTON J. TORRE
BY Eugene M. Whitacre
ATTORNEY

July 6, 1965 D. A. TANNENBAUM ETAL 3,193,743

REMOTE MOTOR CONTROL SYSTEM FOR TV TUNER

Filed April 27, 1960 2 Sheets-Sheet 2

INVENTORS
DANIEL A. TANNENBAUM &
ALTON J. TORRE

BY Eugene M. Whitacre
ATTORNEY

United States Patent Office 3,193,743
Patented July 6, 1965

3,193,743
REMOTE MOTOR CONTROL SYSTEM FOR TV TUNER

Daniel A. Tannenbaum, West Collingswood, and Alton J. Torre, Woodbury, N.J., assignors to Radio Corporation of America, a corporation of Delaware Filed Apr. 27, 1960, Ser. No. 25,049
10 Claims. (Cl. 318—16)

This invention relates to remote control systems and more particularly to wireless remote control systems for controlling the operation of television or radio receivers or the like.

It is often desirable or necessary in remote control systems to provide means for controlling several functions in the remote apparatus. For example, in a television receiver remote control system, it is desirable to provide an on-off control and a sound volume control in addition to the usual channel selection control. The more functions that can be controlled remotely, the more convenient it is for a viewer. However for each function controlled, a control signal of a different frequency, or separate and distinctive modulation of the control signal, is usually required, thereby increasing the cost and complexity of the remote control transmitting and receiving apparatus.

Heretofore, attempts have been made to control in sequence more than one function, such as the sound volume and on-off controls, by a single control signal. More specifically, in a step-by-step remote control system, successive transmissions of the control signal have been used to vary the sound volume to different levels and then after a predetermined number of transmissions, deenergize the television receiver, thereby providing an "off" control. The next transmission reenergizes the television receiver, thereby providing an "on" control and the sound volume control cycle is then repeated. Such a system has the basic disadvantage that the television receiver must be deenergized to complete a cycle of volume control. Furthermore separate power supplies are required for the remote control and television receivers in this system. If the remote control receiver were powered from the television receiver power supply, both receivers would be turned off when the television receiver was deenergized and the viewer would have to move to the television receiver to turn the power back on for each cycle of the control sequence.

Accordingly, it is an object of this invention to provide an improved remote control system wherein a single control signal controls more than one function of a controlled apparatus.

It is another object of this invention to provide an improved remote control system wherein the power on-off function of the controlled apparatus and one or more other functions thereof may be controlled from a remote location by a single control signal even though the remote control receiver is powered from the controlled apparatus.

It is another object of this invention to provide an improved remote control system wherein the on-off and channel selection controls of a television receiver are controlled by a single control signal in a manner that permits selective on and off control from a remote location without the necessity of providing separate power supplies for the remote control and television receivers.

In accordance with the invention, a wireless remote control system includes a remote control receiver powered by the remotely controlled apparatus. The remote control receiver is responsive to a particular transmitted control signal to operate a step-by-step driving device. The driving device controls, in sequence, the power on-off circuit and at least one other function of the remote apparatus. The power on-off circuit includes a master switch which is operable at one of the positions of the step-by-step driving device through a time delay mechanism. This provides the operator with the option of permitting the remote apparatus to be turned off after the time delay, or to remain on by again transmitting a control signal to cause the step-by-step driving device to move to its next position.

In accordance with an embodiment of the invention, the step-by-step driving device includes programming means for causing the tuner of the television receiver to stop on or pass by predetermined channel positions. The programming means may be set up to stop the tuner at channels corresponding to television frequencies which may be received in the geographical area of the television receiver, and at an unused channel position. At the unused channel position, a cam actuates a master switch in the power circuit of the television receiver through a pneumatic time delay mechanism. After a predetermined time delay period, the television receiver power supply circuits are opened and the television receiver is deenergized. During the time delay period, the system can still be operated remotely, if a television receiver "off" condition is not desired, and this, therefore, permits the elimination of a separate power supply for the remote control receiver without incurring any disadvantages.

The novel features which are considered to be characteristic of this invention are set forth with particularity in the appended claims. The invention itself, both as to organization and method of operation, as well as additional objects and advantages thereof, will best be understood by referring to the accompanying drawing and the following description in which:

Figure 1:
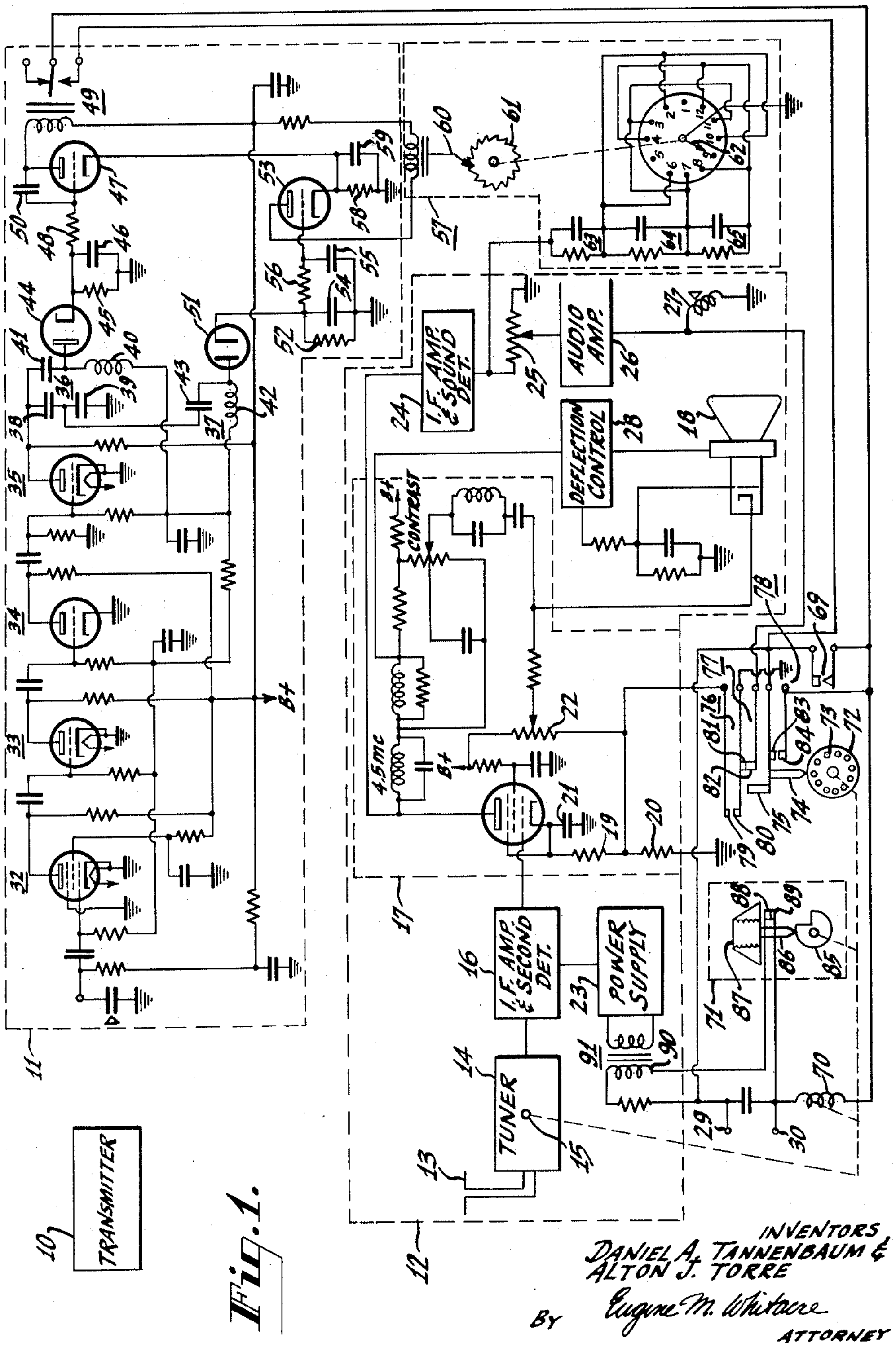
FIGURE 1 is a schematic circuit diagram of a wireless remote control system embodying the invention, connected to control a television receiver which is shown in black diagram form.

Referring now to the drawing wherein like reference numerals are used to designate like components in the various figures and particularly to FIGURE 1, the wireless remote control system includes a transmitter 10 for transmitting control signals which are received by a remote control receiver 11 which controls the operation of a television receiver 12. In the present instance, the remote control transmitter 10 includes means for generating ultrasonic acoustical signals of a first or a second frequency, ($f_1$) or ($f_2$) respectively.

The television receiver 12 includes an antenna 13 for intercepting transmitted signals in the television frequency bands. The antenna 13 is coupled to a known type of tuner 14 which includes step-by-step tuning circuits containing a variable channel selector 15, for selecting any one of a plurality of television channels. As shown, the channel selector 15 is driven by a motor 70. A selected television signal is heterodyned with a local oscillator wave generated in the tuner 14 to provide a corresponding signal of an intermediate frequency. The intermediate frequency signal is amplified and detected in an intermediate frequency amplifier and second detector stage 16. The signal output from the second detector stage 16 includes a composite video signal which is amplified by a video amplifier 17 and applied to a picture tube 18. The video amplifier 17 includes a pair of resistors 19 and 20 connected between the cathode electrode of a grid controlled electron tube and ground and which are bypassed by a capacitor 21. A potentiometer 22 for controlling the picture brightness is connected between the junction of the resistors 19 and 20 and the B+ terminal of a power supply 23 in the television receiver 12. The adjustable arm of the brightness control potentiometer 22 is connected to the cathode of the picture tube 18, thereby providing biasing voltage which controls the intensity of the cathode ray beam.

The intercarrier audio component of the composite video signal is fed from the amplifier 17 to a 4.5 mc. intermediate frequency amplifier and sound detector stage 24 to derive the audio portion of the television signal. The detected audio signal is developed across a volume control potentiometer 25, and a portion of the developed audio signal is applied by way of the adjustable arm of the potentiometer 25 to the input circuit of an audio power amplifier 26. The audio signal output of the amplifier 26 is applied to a loudspeaker which includes a speaker coil 27.

The composite video signal amplified in the video amplifier 17, is also applied to deflection control circuits 28. The deflection control circuits 28 include means for separating and utilizing the synchronizing signal component of the composite video signal to control the deflection of the cathode ray beam in the picture tube 18. The control grid of the picture tube 18 is connected to receive a blanking pulse during the vertical retrace interval from the deflection control circuits 28.

The various stages of the television receiver are suitably connected to the television receiver power supply 23, by connections not shown. The power supply 23 converts A.C. power received from a pair of A.C. line supply terminals 29 and 30 into the A.C. and D.C. voltages required for the proper operation of both the television receiver 12 and the remote control receiver 11.

An ultrasonic control signal radiated from the transmitter 10 is received by a remote control receiver which may be of the type described in the copending application of Robert B. Hansen, entitled Remote Control Receiver filed June 15, 1958, Serial Number 820,464. The remote control receiver 11 includes a plurality of amplifying stages including a preamplifier 32, a pair of cascaded amplifiers 33 and 34, and a driver amplifier 35 which provides sufficient power amplification of the control signal to drive a pair of resonant circuits 36 and 37. The signal output of the driver amplifier 35 is applied directly to the resonant circuit 36 and through coupling capacitors 38 and 39 to the resonant circuit 37.

The resonant circuit 36 includes the series combination of an inductor 40 and a capacitor 41 tuned to the frequency ($f_1$) of one of the transmitted acoustical signals, while the resonant circuit 37 includes the series combination of an inductor 42 and a capacitor 43 tuned to the frequency ($f_2$) of the other of the transmitted signals. The resonant circuits thereby provide the frequency selection in the remote control receiver 11.

Signals at frequency ($f_1$) developed across the inductor 40 are rectified by a rectifier tube 44, and a D.C. voltage is developed across the rectifier load circuit including the parallel combination of a resistor 45 and a capacitor 46. The rectifier voltage output of the rectifier 44 is applied to the grid electrode of a relay control tube 47 through an isolating resistor 48 and is of a polarity to cause the tube 47 to become more conductive. The plate electrode of the relay control tube 47, is connected through the winding of a relay 49, having normally open contacts, to the B+ terminal of the television receiver power supply 23 through a B+ bus line. The amplifying stages 32, 33, 34 and 35 are also connected to the B+ terminal and thereby receive electrical power from the television power supply 23.

When the relay tube 47 becomes more conductive in response to a received control signal, the relay 49 contacts close energizing the tuner 14 drive motor 70. To keep the relay 49 energized long enough to allow the tuner 14 drive motor 70 to get out of the detent position and permit the programming means to take control, a capacitor 50 is connected between the plate and grid electrodes of the relay control tube 47. When the relay tube 47 starts conducting, the capacitor 50 which is initially charged up to the full B+ voltage commences to discharge. When the relay control tube 47 conduction begins to decrease due to decay of the positive input pulse, the capacitor 50 starts recharging from the B+ bus line due to the increased plate voltage of the tube 47. This causes the grid of the tube 47, to be driven positive to keep the tube 47 conducting longer.

Signals at frequency ($f_2$) developed across the inductor 42 are rectified by a rectifier tube 51 and the D.C. voltage developed across the rectifier load resistor 52 is coupled to the grid electrode of a relay control tube 53 through a filter comprising a pair of shunt capacitors 54 and 55 and a series resistor 56. The plate electrode of the relay control tube 53 is connected through the winding of a relay 57 to the B+ terminal of the television receiver power supply 23. Thus all of the tubes in the remote control receiver 11 receives electrical power from the television power supply 23. The relay control tubes 47 and 53 include a common cathode resistor 58, bypassed by a capacitor 59, so that when one of the relay tubes is biased into conduction, the reverse bias in the other relay tube is increased.

The relay 57 includes a spring biased pawl 60 which engages and moves a ratchet 61 when the relay 57 is energized by an electrical control signal of the frequency ($f_2$). The ratchet 61 is mechanically fastened to a rotor 62 which is grounded and makes electrical connections sequentially with a plurality of contacts that are connected to a string of parallel resistive-capacitive impedance combinations 63, 64 and 65. The rotation of the rotor 62 connects differing resistive-capacitive impedance combinations in parallel with the volume control potentiometer 25, thereby varying the audio output of the television receiver. There are 12 positions of the rotor 62 and, for convenience of explanation, these positions are numbered in FIGURE 1.

With the connection shown, four different sound levels are obtained. Going from the lowest to the highest sound level, the sequence of operation is such that rotor positions 2, 6 and 10, cause the resistive-capacitive combination 63 to be shunted across the potentiometer 25. In the 3, 7 and 11 positions of the rotor, the resistive-capacitive combination 64 is connected in series with the combination 63 across the potentiometer 25. Rotor positions 4, 8 and 12 add the combination 65 in series with the other combinations. The positions 1, 5 and 9 are not connected to any resistive-capacitive combinations. Therefore no impedance is shunted across the volume control potentiometer 25 and the loudest sound volume level is achieved and will be determined by the setting of the potentiometer 25. Consequently, four different levels of sound volume can be attained from the remote control transmitter 10 by radiating four successive control signals of the frequency ($f_2$).

The contacts of the relay 49 are connected in parallel with the contacts of the touch bar switch 69 which is conveniently mounted on the television receiver cabinet to be readily accessible to an operator. One contact of the touch bar switch 69 is connected through a driving device, such as a motor, 70 to the A.C. supply line terminal 30 while the other contact is connected directly to the A.C. supply line terminal 29. Therefore the closing of the contacts of either the touch bar 69 or the relay 49 connects the motor 70 directly across the A.C. supply line terminals 29 and 30. The motor 70 has its rotor shaft mechanically coupled to drive the channel selector 15 of the tuner 14. The motor 70 is also mechanically coupled to programming means which includes a cam-operated time delay switch mechanism 71 and a selector wheel 72. Equally spaced about the periphery of the selector wheel 72 are a number of adjustable selector cams 73 corresponding to the number of positions of the channel selector 15. A selector cam follower 74, which co-operates with a lever arm 75 to control the opening and closing of a number of switches 76, 77 and 78 having electrical contacts 79 and 80, 81 and 82, and 83 and 84 respectively, is mounted on the arm of the contact 83 to follow the selector cams 73. The contact 79 is connected to the junction of the resistors 19 and 20 and the contact 82 is connected to the high signal potential side of the speaker coil 27. Both the contacts 80 and 81 are grounded. The contact 83 is connected to the A.C. supply line terminal 29 while the contact 84 is connected to the supply line terminal 30 through the motor 70. By these connections, switch 78 controls the energization of the motor 70; switch 77 controls the audio output and switch 76 controls the video output of the television receiver 12. In FIGURE 1, switches 76 and 78 are shown open and switch 77 closed. This is the position for a de-energized motor 70 with the audio and video channels of the television receiver 12 blocked.

Figure 2:
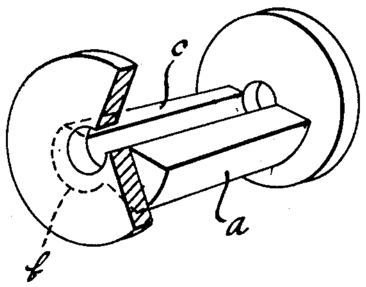
FIGURE 2 is a perspective view of a selector cam portion of the programming means.

As shown in FIGURE 2, three different settings of the selector cams 73 are possible. A high setting "*a*" comprises the original radius of the selector cams 73 whereas a concentrically cut portion of lesser radius comprises an intermediate setting "*b*." To create a low setting, the selector cam is cut lengthwise as shown at "*c*." The schematic representation shown in FIGURE 1 represents an intermediate setting of the selector cams 73.

When the selector cam follower 74 is engaged by a cam 73 set in the low position, the switch 78 is closed and the motor 70 is energized directly from the A.C. input terminals 29 and 30 in a path parallel to that of the contacts of the relay 49. In the low setting, the switch 77 is also closed thereby shorting the speaker coil 27 to ground, which mutes the audio output of the television receiver 12. Simultaneously switch 76 is opened and the circuit path to ground for the brightness control potentiometer 22 is through the potential divider resistor 20. The potential at the adjustable arm of the potentiometer 22 is therefore increased sufficiently in the positive direction to bias the cathode of the picture tube 18 to cut off and thereby blank the picture.

When the cam follower 74 is engaged by a selector cam 73 which has a high setting, the switch 78 opens and disconnects the motor 70 from the A.C. line supply terminals 29 and 30, thereby stopping rotation. Simultaneously switch 77 opens removing the short to ground of the speaker coil 27, and the switch 76 closes, shorting one end of the brightness control potentiometer 22 to ground. Therefore the audio is permitted to develop in the speaker and the picture is returned to the screen of the picture tube 18. This is the programmed stop for reception of the desired television signals that can be received in the area of the television receiver.

When the cam follower 74 is engaged by a selector cam 73 which has an intermediate setting, as shown in FIGURE 1, the switch 78 opens and stops the rotation of the motor 70. However, on this setting, due to the relationship between the physical lengths of the selector cam follower 74 and the lever arm 75, the switch 77 remains closed and the switch 76 remains opened muting the sound and blanking the picture in the television receiver, as explained above. This is a programmed setting which results in a television receiver "mute" condition. However the television receiver 12 is still energized and no warm up delay period is required, in order to tune to a different channel.

The electro-pneumatic time delay switch 71 includes a cam disc 85 having a nadir position on the periphery thereof, a spring biased cam follower 86, a pneumatic holding device 87 and a pair of master switch contacts 88 and 89. The master contacts 88 and 89 are connected in series between the terminals of a primary winding 90 of a power transformer 91 in the television power supply 23 and the A.C. supply line terminals 29 and 30. By these connections, the master contacts 88 and 89 can make or break the power connections to the primary winding 90 of the transformer 91 and thereby turn "on" or "off" both the television receiver 12 and the remote control receiver 11 simultaneously.

Figure 3:
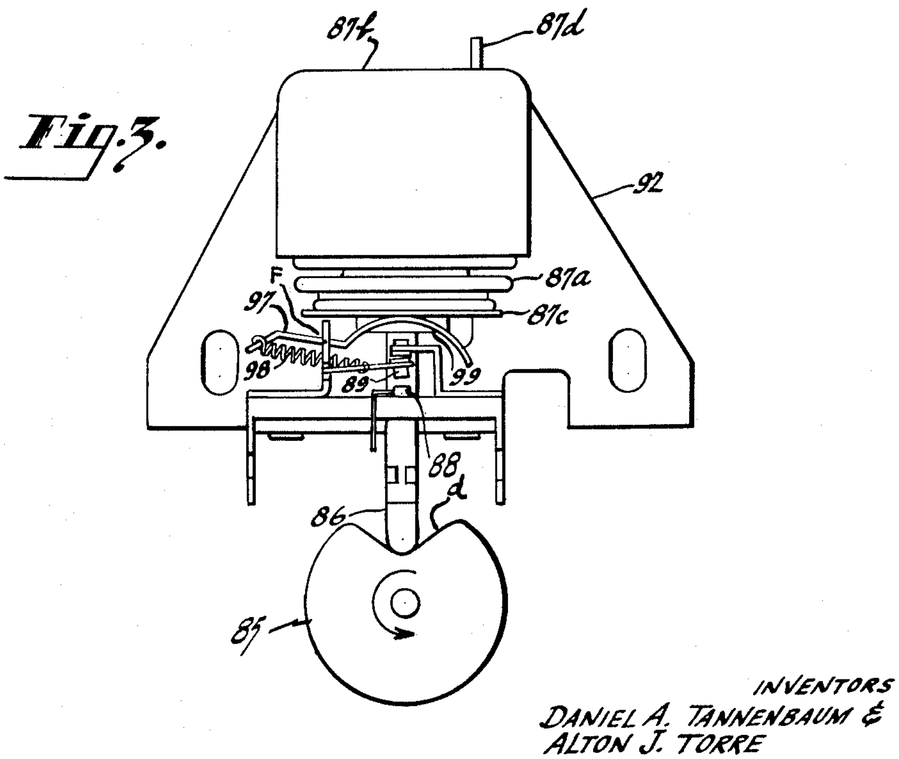
FIGURE 3 is a front view of a time-delay electro-pneumatic mechanism which is shown schematically in FIGURE 1.

One specific type of time delay switch 71 is shown in FIGURE 3. The time delay electro-pneumatic switch mechanism 71 includes a frame member 92 on which is mounted a pneumatic holding device comprising a bellows 87*a* attached to a cup 87*b* and sealed by a plate 87*c*. The bellows 87*a* is expansible within the cup 87*b* which includes an orifice 87*d* for intake and outlet of air. A snap switch 97 biased by a spring 98 and containing the master contacts 88 and 89 is also mounted on the frame member 92 to be activated by the expansion and contraction of the bellows 87*a*. The cam follower 86 is mounted on the plate 87*c* and is urged against the cam disc 85 by a leaf spring 99 mounted on the frame member 92. The leaf spring 99 keeps the cam follower 86 in close contact with the cam disc 85 during rotation, so that the cam follower 86 can control the expansion and contraction of the bellows 87*a* and thereby the opening and closing of the master contacts 88 and 89.

When the cam follower 86 is in the nadir position of the cam disc 85, the bellows 87*a* is expanded and the master contacts 88 and 89 are open. As the cam disc 85 rotates, the cam follower 86 rises out of this position and compresses the bellows 87*a*. Air is forced out through the orifice 87*d* and the master contacts 88 and 89 close under the urging of the biasing spring 98. When the cam disc 85, rotating counterclockwise as shown in FIGURE 3, makes a complete rotation, the cam follower 86 is urged into the nadir position of the cam disc 85 by the leaf spring 99. The removal of the restraining force exerted by the cam follower 85 permits the intake of air through the orifice 87*d* and the bellows 87*a* expands. The expansion of the bellows 87*a* is controlled primarily by the size of the orifice 87*d* which is designed so that there will be a predetermined time delay interval before the bellows 87*a* expands sufficiently to open the master contacts 88 and 89. With the opening of the contacts 88 and 89 the television receiver power supply 23 is de-energized.

As shown in FIGURE 3, the nadir position of the cam disc 85 has shoulders of differing gradations. A more steeply cut shoulder "*d*" is provided in the direction of rotation of the cam disc 85 so that the cam follower 86 will ride up the shoulder "*d*" quickly. This will rapidly compress the bellows and prevent it from expanding sufficiently to open the master contacts 88 and 89 should a viewer not wish to turn off the television receiver.

In operation, programming means of the wireless remote control system will be programmed in accordance with the television channels that can be received in a given geographical area. If we assume operation in an area where channels 3, 6 and 10 are received the adjustable selector cams 73 on the selector wheel 72 will be preset to the high position so that these channels will be tuned in. In addition, it is necessary to select an unused channel to function as a television "off" position where both the television and remote control receivers can be completely deenergized after a predetermined time delay period. For illustrative purposes, channel 13 is chosen as the "off" position and the cam disc 85 is positioned so that the cam follower 86 may be operated in the channel 13 position, and the selector cam for channel 13 is set to the low position. This stops the rotation of the motor 70 but does not "mute" the audio and picture in the television receiver so that a viewer can distinguish this position from a "mute" position. It may be desirable to choose a television sound and picture "mute" position where no picture is visible and no sound is audible but where the television receiver 12 is still energized and requires no warm-up delay period to tune in the various channels. Channel 8 is chosen for the "mute" position, and the selector cam for this channel position is set at the intermediate position. The other channels in the television receiver are programmed so that the channel selector 15 rotates past them without stopping. In this example, a viewer watching channel 3 can tune to channel 6 by transmitting the frequency ($f_1$). The motor 70 is energized and the channel selector 15 is programmed to pass channels 4 and 5 and stop on channel 6. If a television receiver "mute" condition is then desired, the viewer can transmit a signal of the frequency ($f_1$) once more and the channel selector 15 will pass channel 7 and stop on channel 8 where no picture is visible and no sound is audible. To return to channel 6, the viewer would transmit successively three more control signals of the frequency ($f_1$) since the rotation of the motor 70 is uni-directional and stops have been programmed at channels 10, 13 and 3. To turn the television receiver 12 "off" the viewer causes successive control signals of frequency ($f_1$) to be transmitted to rotate the channel selector 15 to the channel 13 position whereupon, after a predetermined time interval, the television receiver 12 is deenergized. The time delay period is sufficiently long to permit a viewer to transmit a signal of frequency ($f_1$) once again to cause rotation of the channel selector before the television receiver is deenergized.

When the television receiver is "off," a viewer may turn it "on" by pressing the touch bar switch 69 mounted on the television receiver cabinet. In the "off" position, the cam follower 86 of the time delay switch 71 is in the nadir position on the cam disc 85. The master contacts 88 and 89 are open and the power transformer 91 is disconnected from the A.C. supply line terminals 29 and 30. The pressing of the touch bar 69 places the motor 70 directly across the A.C. supply line terminals 29 and 30 and the motor commences rotation. The shaft of the motor 70, mechanically coupled to the cam disc 85, forces the cam follower 86 to close the master contacts 88 and 89 and places the primary winding 90 of the television transformer 91 directly across the A.C. supply line terminals. The television and remote control receivers are now energized and, after a warm-up period, is prepared for remote operation.

A transmission of a control signal of the frequency ($f_1$) closes the normally open contacts of the relay 49 and places the motor 70 directly across the A.C. supply line terminals 29 and 30. The motor 70 will commence rotation and will not stop until the next programmed stopping position is reached. The selector wheel 72 rotates in conjunction with the motor 70 and actuates the selector cam follower 74 and the lever arm 75 on the arm of the contact 83 to open and close switches 76, 77 and 78 depending on the settings of the adjustable selector cams 73.

A remote control system is provided with a time delay mechanism so that the power on-off control and at least one other operation of the remotely located apparatus may be combined for control by a particular control signal radiated in successive transmissions even though the remote control receiver is powered from the controlled apparatus. The cost and complexity of the remote control system is thereby reduced.

What is claimed is:

1. A wireless remote control system for control of remotely located apparatus having an internal power supply, comprising the combination of a remote control receiver connected to receive power from said internal power supply, a sequentially operated multi-position step-by-step driving device coupled to control an operation of said remotely located apparatus, a time delay switch operated after a predetermined time interval at one position of said step-by-step driving device, means connecting said switch to open the circuit of said internal power supply and deenergize said remotely located apparatus and said remote control receiver after said predetermined time delay in said one position of said step-by-step driving device, and means coupling said remote control receiver to control the operation of said step-by-step driving device from one position to the next.

2. In a wireless remote control system including a remote control receiver responsive to a transmitted control signal to control an operation of a remote apparatus having an internal power supply with an on-off control switch, the combination comprising means coupling said remote control receiver to said internal power supply to receive power therefrom, a multi-position step-by-step driving device coupled to and operated by said remote control receiver in response to said control signal, a time delay mechanism, said driving device coupled to said remote apparatus for controlling in sequence said time delay mechanism and said operation of said remote apparatus, said time delay mechanism coupled to actuate said on-off control switch after a time delay at one of the positions of said step-by-step driving device.

3. In a television receiver having a step-by-step tuner having a plurality of channel positions for selecting any one of a plurality of television channel frequencies and having an internal power supply coupled to a pair of A.C. supply line terminals to derive electrical power therefrom and supply the appropriate A.C. and D.C. voltages to said television receiver, the combination comprising, a driving motor for said tuner, said driving motor adapted to be energized from the A.C. supply line terminals, a time delay mechanism, a cam driven by said motor for actuating said time delay mechanism at one of the channel positions of said tuner, an on-off switch connected in said power supply circuit and positioned for operation by said time relay mechanism after a predetermined time delay programming means driven by said motor for causing said tuner to stop a predetermined channel positions including said one position and pass by the other channel positions, and means for selectively energizing said motor from said A.C. supply line terminals in a path not including said on-off switch.

4. A wireless remote control system, utilizing radiated control signals of a particular frequency, for controlling a number of operations in a remote apparatus, comprises the combination of first circuit means for receiving and control signals, a step-by-step driving device, second circuit means for energizing and deenergizing said driving device to cause the device to go and stop respectively, means coupling said first circuit means to said second circuit means so that said control signals will activate said driving device, means mechanically coupling said driving device to said remote apparatus, programming means, means coupling said programming means to said driving device to control the rotation thereof, and means coupling said programming means to the remote apparatus whereby the activation of said driving device will control a number of operations in the remote apparatus in accordance with the manner in which said programming means are preset.

5. In a wireless remote control system for controlling in sequence in a remote apparatus a pair of functions, one function being operable from a two position cycle control and the other from a multi-position cycle control, the combination comprising a step-by-step rotary driving device, a time relay switch coupled to the remote apparatus for controlling the operation of the two position cycle function, a selector wheel coupled to the remote apparatus having a plurality of positions thereon for controlling the operation of the multi-position cycle function, means mechanically coupling said driving device to both said time delay switch and said selector wheel to control sequentially their motion by steps, and time delay means for isolating the steps corresponding to the two position cycle function from the steps corresponding to the multi-position cycle function to prevent interference between the functions being controlled.

6. In a wireless remote control system, including a remote control receiver responsive to a transmitted control signal and coupled to a remote apparatus having an internal power supply with an on-off control switch to control an operation of and also receive power from the remote apparatus, the combination comprising a multi-position step-by-step driving device coupled to and operated by said remote control receiver in response to said control signal, a time delay mechanism, said driving device coupled to said remote apparatus for controlling in sequence said time delay mechanism and said operation of said remote apparatus, said time delay mechanism coupled to actuate said on-off control switch after a time delay at one of the positions of said step-by-step driving device whereby said power supply may be turned "off" when said driving device is left on said one position but which also may be kept "on" by transmitting a control signal to move said driving device to the next position.

7. A remote control system for varying the impedance of a volume control potentiometer in a television receiver comprising in combination a remote control receiver including means for receiving and transducing an ultrasonic signal of a predetermined frequency to produce an electrical control signal of a corresponding frequency, means for amplifying the electrical control signal, resonant circuit means tuned to select electrical control signals of said predetermined frequency and produce an oscillatory voltage, a rectifier, means applying said oscillatory voltage to said rectifier to produce a D.C. control voltage, a relay control tube, means for applying said D.C. control voltage to bias to conduction said relay control tube, a relay, means coupling said relay to said relay control tube to energize upon conduction thereof, said relay comprising a spring-biased pawl, actuated by a magnetic pull when said relay is energized, a ratchet rotated by said pawl when said relay is energized and a rotor connected to a series of impedance combinations, said impedance combinations coupled in parallel with said potentiometer, said rotor mechanically coupled to said ratchet to rotate in conjunction therewith whereby the impedance combinations will be shunted across the volume control potentiometer and vary the sound output of the television receiver.

8. In a television receiver having a step-by-step tuner having a plurality of channel positions for selecting any one of a plurality of television channel frequencies and having an internal power supply coupled to a pair of A.C. supply line terminals to derive electrical power therefrom and supply the appropriate A.C. and D.C. voltages to said television receiver the combination comprising a remote control receiver coupled to receive power from said television receiver power supply, a driving motor for said tuner, said driving motor adapted to be energized from the A.C. supply line terminals, a time delay mechanism, a cam driven by said motor for actuating said time delay mechanism at one of the channel positions of said tuner, an on-off switch connected in series between said power supply and the A.C. supply line terminals and positioned for operation by said time delay mechanism after a predetermined time delay, programming means driven by said motor for causing said tuner to stop at predetermined channel positions including said one position and pass by the other channel positions, and a touch bar switch connected to energize said motor directly from said A.C. supply line terminals.

9. In a wireless remote control system, including a remote control receiver responsive to a particular transmitted control signal for controlling the operation of a television receiver having an internal power supply energized from a pair of A.C. line supply terminals through an on-off control switch for supplying the appropriate A.C. and D.C. voltages to both the television and remote control receivers, with said television receiver having a multi-position channel selector as well as audio and video output means, the combination comprising a rotary step-by-step motor adapted to be energized from the A.C. line supply terminals, said motor mechanically coupled to rotate the channel selector, a selector wheel mechanically coupled to said motor to rotate in conjunction therewith, a plurality of adjustable selector cams circularly mounted on the selector wheel and positioned to correspond spatially with the channel positions on the channel selector in the television receiver, a plurality of switches with a selector cam follower mounted thereon to follow said selector cams, said switches electrically coupled to said motor and to said audio and video output means, said selector cams being adjustable to open and close said switches and thereby stop and start said motor and block and unblock the audio and video output means at programmed channel positions, a time delay mechanism comprising an expansible pneumatic holding device, a cam follower and a cam disc having a nadir position on the circumference thereof, said cam disc being mechanically coupled to said motor to rotate in conjunction therewith, said cam follower mounted under spring bias on said time delay mechanism to follow the circumference of said cam disc, said pneumatic holding device mounted on said time delay mechanism to expand and contract when said cam follower is respectively forced into and out of the nadir position on said cam disc upon the rotation thereof, said on-off control switch being mounted on said time delay mechanism to open and close when said pneumatic holding device expands and contracts respectively, said pneumatic holding device having a time delay period before expanding fully enough to open said on-off control switch whereby desired television channels may be selected by adjusting said selector cams to stop the rotation of said motor and to mute the audio and blank the video output means of the television receiver during transition between stopping positions and also to stop the rotation of said motor at the nadir position of said cam disc so that after a time delay said pneumatic holding device will open the on-off control switch and turn off the television receiver.

10. In a wireless remote control system containing a remote control receiver for controlling the operation of a television receiver having an internal power supply coupled to a pair of A.C. supply line terminals to derive electrical power therefrom and supply the appropriate A.C. and D.C. voltages to both the television and remote control receiver, the combination comprising, a rotary step-by-step driving device, said driving device being energized from the A.C. supply line terminals, a time delay switch including a pneumatic holding device, a pair of master contacts, a cam follower, and an annular cam disc having a nadir position on the periphery thereof, said cam disc being mechanically coupled to said driving device, said cam follower mounted on said time delay switch to follow the circumference of said cam disc, said pneumatic holding device mounted on said time delay switch to expand and contract when said cam follower is respectively forced into and out of the nadir position on said cam disc upon the rotation thereof, said master contacts being coupled to said pneumatic holding device to open and close when said pneumatic holding device expands and contracts respectively, said power supply being connected to the A.C. supply line terminals through said master contacts and supplying electric power to both the television and remote control receivers when the master contacts are closed, said pneumatic holding device having a time delay period before expanding to open said master contacts whereby said driving device can rotate said cam disc through said nadir position without the master contacts opening and deenergizing the television and remote control receivers.

References Cited by the Examiner

UNITED STATES PATENTS

| | | | |
|---|---|---|---|
| 2,154,437 | 4/39 | Colton | 318—484 X |
| 2,367,960 | 1/45 | Parfitt | 318—16 X |
| 2,614,239 | 10/52 | Smith et al. | 318—485 X |
| 2,668,874 | 2/54 | Augustadt et al. | 318—460 X |
| 2,759,043 | 8/56 | Long | 318—485 X |
| 2,816,259 | 12/57 | Papitto | 178—6 |
| 2,833,976 | 5/58 | Kennedy et al. | 178—6 |
| 2,840,204 | 6/58 | Mathamel et al. | 318—484 X |
| 2,897,354 | 7/59 | Bourget et al. | 178—6 |
| 2,930,955 | 3/60 | Bourget et al. | 178—6 |
| 2,981,878 | 4/61 | Henderson | 318—485 X |
| 2,989,677 | 6/61 | Marks | 318—464 X |

OTHER REFERENCES

TV Remote Controls, Radio and TV News, November 1957, pages 58–61.

17" TV Receiver With Remote Control RCA Engineer, volume 5, No. 1, June–July 1959, pages 33–35.

ORIS L. RADER, *Primary Examiner.*

MILTON O. HIRSHFIELD, *Examiner.*